United States Patent
Voland et al.

(10) Patent No.: US 12,286,262 B2
(45) Date of Patent: Apr. 29, 2025

(54) GLASS VESSEL

(71) Applicant: ReViSalt GmbH, Freiberg (DE)

(72) Inventors: Thomas Voland, Grossweitzchen (DE);
Sabine Hönig, Dittmannsdorf (DE);
Martin Gross, Pockau-Legefeld (DE);
Michael Heidan, Dietzenbach (DE)

(73) Assignee: ReViSalt GmbH, Freiberg (DE)

( * ) Notice: Subject to any disclaimer, the term of this patent is extended or adjusted under 35 U.S.C. 154(b) by 19 days.

(21) Appl. No.: 18/024,352

(22) PCT Filed: Sep. 2, 2021

(86) PCT No.: PCT/EP2021/074283
§ 371 (c)(1),
(2) Date: Mar. 2, 2023

(87) PCT Pub. No.: WO2022/049204
PCT Pub. Date: Mar. 10, 2022

(65) Prior Publication Data
US 2023/0331424 A1  Oct. 19, 2023

(30) Foreign Application Priority Data
Sep. 3, 2020 (LU) ........................................ 102044

(51) Int. Cl.
*B65D 1/02* (2006.01)
*A47G 19/22* (2006.01)
(Continued)

(52) U.S. Cl.
CPC ........ *B65D 1/0215* (2013.01); *A47G 19/2205* (2013.01); *B65D 1/10* (2013.01); *C03C 21/002* (2013.01)

(58) Field of Classification Search
CPC ...... B65D 1/0215; B65D 1/10; B65D 1/0207; A47G 19/2205; C03C 21/002; C03C 21/00; C03B 27/012; C03B 27/016
See application file for complete search history.

(56) References Cited

U.S. PATENT DOCUMENTS

| | | | |
|---|---|---|---|
| 1,592,429 A * | 7/1926 | Kraus | .................... C03C 21/00 428/29 |
| 3,433,611 A | 3/1969 | Saunders et al. | |

(Continued)

FOREIGN PATENT DOCUMENTS

| | | |
|---|---|---|
| DE | 157966 A3 | 12/1982 |
| DE | 19510202 C2 | 12/1997 |

(Continued)

*Primary Examiner* — Shawn M Braden
(74) *Attorney, Agent, or Firm* — Hodgson Russ LLP

(57) ABSTRACT

The invention relates to a glass vessel having at least one wall and manufactured from a base material which is an alkali-containing silicate glass. It is a feature of the glass vessel that at least a surface layer is enriched in potassium and depleted of sodium and/or lithium, while an inner layer, especially one directly adjoining the surface layer, is not enriched in potassium and not depleted of sodium and/or lithium, and that the glass vessel has compressive stress up to a compressive stress depth and tensile stress beyond the compressive stress depth, wherein the tensile stress rises with increasing depth up to a tensile stress maximum within the inner layer and/or wherein the progression of the tensile stress as a function of depth does not have a linear section and/or wherein the progression of the tensile stress as a function of depth does not have a section in which tensile stress is constant.

20 Claims, 4 Drawing Sheets

Figure 1:
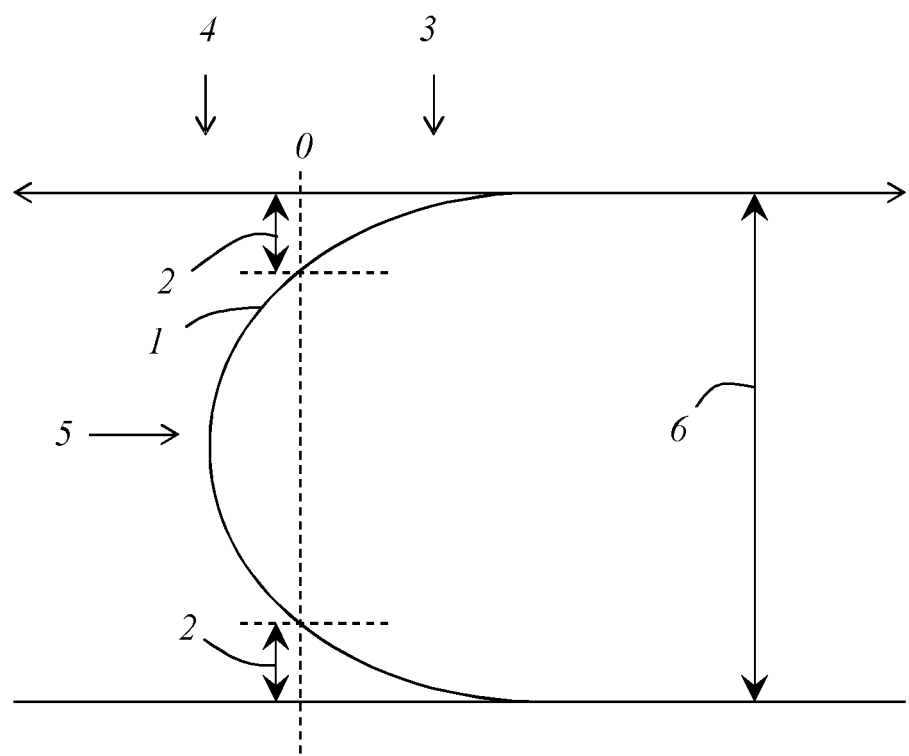

(51) Int. Cl.
  *B65D 1/10*    (2006.01)
  *C03C 21/00*   (2006.01)

(56) References Cited

U.S. PATENT DOCUMENTS

| | | | | |
|---|---|---|---|---|
| 2013/0101798 | A1* | 4/2013 | Hashimoto | C03C 3/085 |
| | | | | 428/157 |
| 2013/0171456 | A1* | 7/2013 | Fadeev | B65D 23/0821 |
| | | | | 428/429 |
| 2013/0327740 | A1* | 12/2013 | Adib | C03C 21/002 |
| | | | | 65/30.14 |
| 2014/0001143 | A1* | 1/2014 | Fadeev | C08G 73/1071 |
| | | | | 215/12.2 |
| 2019/0016627 | A1 | 1/2019 | Li et al. | |
| 2019/0308394 | A1* | 10/2019 | Alkemper | C03C 3/083 |
| 2020/0002225 | A1 | 1/2020 | Schneider | |
| 2020/0251082 | A1* | 8/2020 | Smith | B32B 17/10743 |
| 2023/0312389 | A1* | 10/2023 | Voland | C03C 21/00 |
| | | | | 65/104 |

FOREIGN PATENT DOCUMENTS

| | | |
|---|---|---|
| DE | 112014003344 T5 | 3/2016 |
| WO | 2020205304 A1 | 10/2020 |

* cited by examiner

GLASS VESSEL

CROSS-REFERENCE TO RELATED APPLICATIONS

The present application is a national phase entry under 35 USC § 371 of International Application PCT/EP2021/074283 filed Sep. 2, 2021, claiming priority to and benefit of Luxembourgian Patent Application No. 102044 filed Sep. 3, 2020, the entire disclosure of which is incorporated herein by reference.

FIELD

The disclosure relates to a glass container which has at least one wall and which is made of a base material which is an alkali-containing silicate glass.

BACKGROUND

There are a variety of hardening and strengthening methods known for ideally adapting glass, as a versatile high-tech material, to the particular use. The majority of hardening and strengthening methods either can be employed only at great cost and complexity, and/or have relied on the use of— usually expensive—specialty glass.

For example, it is known practice to increase the fracture strength of glass through what is called thermal prestressing (colloquially also called thermal hardening or heat treatment). In this case the glass workpiece to be strengthened is heated in a kiln to around 600° C. and then rapidly quenched to room temperature. This quenching causes the surface to solidify, and there is little subsequent change in the external dimensions of the component. Compressive stresses are developed at the surface of the glass workpiece and lead ultimately to a higher fracture strength. The thermal prestressing is employed in particular when producing single-sheet safety glass (toughened safety glass; TSG). The stress profile of single-sheet safety glass exhibits high tensile stresses over the glass thickness in the interior, which in the event of failure of the sheet result in a characteristic crazed appearance.

It is also known practice to strengthen glass articles by chemical prestressing. With chemical prestressing, a distinction is made between processes involving high-temperature ion exchange and processes involving low-temperature ion exchange. Only low-temperature ion exchange processes, entailing the replacement of one alkali metal ion by a larger alkali metal ion, have been employed industrially to date. With these processes, a compressive stress zone at the surface of the glass is achieved by an ion exchange which takes place usually in a bath of molten salt, between the glass surface and the salt bath. For example, sodium ions are replaced with potassium ions, producing a compressive stress zone in the glass surface because the potassium ions are larger than the sodium ions. For standard commercial glasses (alkali metal-alkaline earth metal silicate glasses), the treatment time in the salt melt is very long, which is disadvantageous. The time is typically between 8 and 36 hours. The problem of the long process times can be mitigated by the use of expensive specialty glasses in conjunction with the application of complicated, more particularly multistage treatment methods.

DD 1579 66 discloses a method and an apparatus for strengthening of glass products by ion exchange. The glass products in this case are strengthened by exchange of alkali metal ions between the glass surface and alkali metal salt melts. The strengthening sees hollow glass products with their opening turned downward, or hollow glass products which are rotated or swiveled about a horizontal axis, being irrigated with the salt melt. In this operation, the salt is continuously circulated and passed through perforated plates to generate a cascaded irrigation for the glass products, which are arranged in multiple layers. Unfortunately, for economic viability, this method can be utilized only with the use of comparatively expensive specialty glass.

DE 195 10 202 C2 discloses a method for producing hollow glass bodies by the blow-and-blow and press-and-blow shaping method with enhanced mechanical strength. A feature of the method is that the blow pressure air in the parison mold and/or finish mold of the blow-and-blow shaping method or in the finish mold of the press-and-blow shaping method is admixed with mists of aqueous alkali metal salt solutions.

DE 11 2014 003 344 T5 discloses a chemically hardened glass for flat screens of digital cameras, mobile phones, digital organizers, etc. The chemically hardened glass has a compressive stress layer generated by an ion exchange method, with the glass having a surface roughness of 0.20 nm or higher and with the hydrogen concentration Y in the region to a depth X from an outermost surface of the glass satisfying the equation $Y=aX+b$ where $X=$from 0.1 to 0.4 (μm). The glass is preheated to a temperature of 100° Celsius and then immersed in molten salt.

SUMMARY

It is the object of the present disclosure to specify a glass container which has a high strength and which can be produced rapidly and inexpensively in particular in the context of mass production.

The object is achieved by a glass container which is characterized in that
  a. at least one surface layer is enriched in potassium and depleted in sodium and/or lithium, while an inner layer, more particularly an inner layer directly bordering the surface layer, is not enriched in potassium and not depleted in sodium and/or lithium, and in that
  b. the glass container, down to a compressive stress depth, has a compressive stress and beyond the compressive stress depth has a tensile stress, where the tensile stress rises with increasing depth up to a tensile stress maximum disposed in the inner layer and/or where the profile of the tensile stress as a function of the depth has no linear portion and/or where the profile of the tensile stress as a function of the depth has no portion in which the tensile stress is constant.

In a manner in accordance with the disclosure it has been recognized that through a combination of thermal and chemical hardening, a glass container, composed more particularly of conventional utility glass can have strength values which are a multiple above the strength values of an identical but untreated glass container.

The disclosure has the very particular advantage that particularly for utility articles in daily life, by virtue of the enhanced fracture strength, the required wall thickness of the glass article is lower. This has the consequence that in the production of the glass articles, relative to glass articles produced conventionally from the same glass material, glass can be saved. More particularly, therefore, the glass articles produced in accordance with the disclosure can have a lower intrinsic weight than glass articles produced conventionally from the same glass material.

In a manner in accordance with the disclosure it has been recognized in particular that particularly good results are achieved if a blank is first produced in the known way and is heated to a primary temperature which lies at most 50 Kelvins below and at most 30 Kelvins above the Littleton softening point of the glass material. In contrast to the conventional heat treatment, however, the blank is preferably not quenched suddenly to room temperature, but instead to a higher temperature. The heated blank is preferably quenched to a quenching temperature which lies at least 200 Kelvins and at most 550 Kelvins, more particularly at least 200 Kelvins and at most 450 Kelvins, below the primary temperature.

Thereafter there may be an ion exchange process whose effect is that ultimately at least one surface layer is enriched in potassium and depleted in sodium and/or lithium, while an inner layer, more particularly an inner layer directly bordering the surface layer, is not enriched in potassium and not depleted in sodium and/or lithium. For the ion exchange process, in accordance with the disclosure, the treatment times required are substantially shorter than in the case of known methods of chemical hardening, for the attainment overall of a substantial increase in the strength values. The ion exchange process may follow—in particular, directly—the quenching process. In particular, it is possible in this way to attain very high strength values, particularly in relation to flexural fracture strength, microhardness and scratch resistance, which exceed by a multiple the strength values of an untreated but otherwise identical glass container.

As a result of the type of treatment elucidated above, the glass container of the disclosure has a compressive stress down to a compressive stress depth and beyond the compressive stress depth has a tensile stress, where the tensile stress rises with increasing depth up to a tensile stress maximum disposed in the inner layer and/or where the profile of the tensile stress as a function of the depth does not have a linear portion and/or where the profile of the tensile stress as a function of the depth does not have a portion in which the tensile stress is constant. This distinguishes the glass container of the disclosure very importantly from, for example, glass containers which have been treated by a known chemical prestressing method.

The glass container of the disclosure may advantageously be embodied in particular in such a way that the surface layer has a thickness in the range from 0.5 µm to 60 µm, more particularly in the range from 0.5 µm to 30 µm, more particularly in the range from 0.5 µm to 15 µm. Advantageously it has been recognized that very high strength values are achieved if the surface layer has the stated thickness, with the stated thickness of the surface layer being, advantageously, attainable comparatively quickly in spite of the move away from expensive specialty glasses with their costly and inconvenient production.

The glass container may advantageously be embodied in particular in such a way that at least one surface layer is enriched in potassium and depleted in sodium, while an inner layer, more particularly an inner layer directly bordering the surface layer, is not enriched in potassium and not depleted in sodium and/or lithium, or in such a way that at least one surface layer is enriched in potassium and depleted in sodium and/or lithium, while an inner layer, more particularly an inner layer directly bordering the surface layer, is not enriched in potassium and not depleted in lithium.

An especially robust glass container is a container which has at least one wall having two surface layers, which more particularly are parallel to one another. It is advantageously possible here for each of the two surface layers to be enriched in potassium and depleted in sodium and/or lithium, while an inner layer disposed between the surface layers is not enriched in potassium and not depleted in sodium and/or lithium, and for the wall on each of both sides to have a compressive stress down to a compressive stress depth and beyond the compressive stress depth a tensile stress, where the tensile stress rises with increasing depth up to a tensile stress maximum disposed in the inner layer and/or where the profile of the tensile stress as a function of the depth does not have a linear portion and/or where the profile of the tensile stress as a function of the depth does not have a portion in which the tensile stress is constant. This may be achieved more particularly by both outer sides of the wall of the glass container being treated identically.

In this case the glass container may advantageously be embodied more particularly in such a way that each of the two surface layers is enriched in potassium and depleted in sodium, while an inner layer disposed between the surface layers is not enriched in potassium and not depleted in sodium and/or lithium, or in such a way that each of the two surface layers is enriched in potassium and depleted in sodium and/or lithium, while an inner layer disposed between the surface layers is not enriched in potassium and not depleted in lithium.

In particular, in those regions of the wall of the glass container in which the surface layers are embodied identically and are parallel to one another, the tensile stress maximum is usually disposed centrically between the surface layers. It is, however, also possible for the glass container to have regions in which the tensile stress maximum is disposed eccentrically between the surface layers. This may be achieved more particularly through the selection of the geometry of the glass container and/or through a difference in treatment of the surface layers of the wall in the course of production, especially in the course of the strengthening.

More particularly the glass container may be embodied in such a way that in regions in which a high utility load is anticipated, it has a particularly large stress gradient on that side of the wall that is oriented toward the anticipated force exposure, while it may have a smaller stress gradient on that side of the wall that is facing away from the anticipated force exposure.

In another configuration, only a first of the two surface layers is enriched in potassium and depleted in sodium and/or lithium, while the other surface layer and an inner layer disposed between the surface layers are not enriched in potassium and not depleted in sodium and/or lithium, where the wall on each of both sides has a compressive stress down to a compressive stress depth and beyond the compressive stress depth has a tensile stress, where the tensile stress rises with increasing depth up to a tensile stress maximum disposed in the inner layer and/or where the profile of the tensile stress as a function of the depth does not have a linear portion and/or where the profile of the tensile stress as a function of the depth does not have a portion in which the tensile stress is constant. A glass container of this kind may be achieved, for example, by first producing the blank and then subjecting only the outer side of the blank to further treatment in the manner described above. In particular the approach may be, for example, that the glass container is sealed before the ion exchange process and therefore the ion exchange process takes place exclusively on the outer side of the glass container. With a glass container of this kind, the tensile stress maximum is usually situated eccentrically between the surface layers of the wall of the glass container.

The wall of the glass container of the disclosure may advantageously have a thickness in the range from 0.5 mm to 5 mm, more particularly in the range from 1 mm to 3 mm or in the range from 1.5 mm to 3 mm or in the range from 2 mm to 3 mm. More particularly the wall may have a thickness of more than 1.5 mm. It has emerged that with thicknesses of these kinds, particularly good strength values are achievable by comparison to identical but untreated glass containers. This is especially advantageous because glass containers having such walls are used in particular in large quantities as utility containers, such as yoghurt containers or milk bottles or containers for other beverages, for example, and in particular in multiple-use systems as well.

A feature which can be advantageously exploited in particular is that for a given strength, a glass container of the disclosure can have a significantly lower weight, since a substantially lower wall thickness and therefore less glass material are required. The production of such a glass container requires less material, and this reduces the materials costs. Furthermore, for given external dimensions, the lower wall thickness means that the capacity is greater than in the case of conventional glass containers of identical material and identical strength. Furthermore, transport is simplified and in particular made more cost-effective, because the glass container of the disclosure weighs less than a conventional glass container of identical material and identical strength.

The glass container of the disclosure may in particular be embodied such that the strength, more particularly a resistance measured in accordance with DIN EN 7458, method B, of the glass container is at least 1.5 times, more particularly at least twice or at least three times or at least four times or at least five times, higher than the strength of an identical glass container, more particularly of a glass container of identical shape and size and identical base material, that does not have the above-stated special features of the glass container of the disclosure. The glass container of the disclosure may be produced more particularly in such a way that the surface layer (or surface layers) has (or have) an increased hardness by comparison with the inner layer, and/or in such a way that the surface layer (or the surface layers) has (or have) a Martens hardness, more particularly measured in accordance with DIN EN ISO 14577-1 under a test force of 2N, in the range from 3500 N/mm2 to 3900 N/mm2, more particularly in the range from 3650 N/mm2 to 3850 N/mm2. As already mentioned, the glass container of the disclosure can have such strength values despite the fact that no expensive specialty glasses are used as raw material and despite the fact that no long strengthening process times have to be accepted. Process times of less than an hour are usually sufficient to achieve the abovementioned strength of the glass container.

The glass container may advantageously be embodied in such a way that in the surface layer the fraction of potassium down to a depth in the range from 0.5 μm to 10 μm is greater than the total fraction of sodium and lithium and that the fraction of potassium beyond a depth in the range from 0.5 μm to 10 μm is less than the total fraction of sodium and lithium. A configuration of this kind advantageously exhibits particularly high strength.

Alternatively or additionally it is also possible for the depletion of sodium and/or lithium in the potassium-enriched surface layer down to a depth of at least one quarter of the thickness of the surface layer to be at least 50 percent by mass.

The glass material of which the glass container is produced is advantageously an alkali metal-alkaline earth metal silicate glass, more particularly a soda-lime glass, or a borosilicate glass. These glasses, and especially alkali metal-alkaline earth metal silicate glass, have the particular advantage that they are obtainable inexpensively. Alkali metal-alkaline earth metal silicate glass has the additional advantage that it is easy to recycle. In particular there is no problem in disposing of a glass container of the disclosure of this kind in a waste glass receptacle.

The glass material of which the glass container is produced may also be an aluminosilicate glass. Preferably, however, the glass material is not aluminosilicate glass, because such glass is too complicated and in particular too expensive to produce. The glass material preferably has an aluminum oxide fraction of less than 5% (percent by mass) ($Al_2O_3$<5%), more particularly of less than 4.5% (percent by mass) ($Al_2O_3$<4.5%).

The glass material may advantageously have a silicon dioxide fraction ($SiO_2$) of more than 58% (percent by mass) and of less than 85% (percent by mass), more particularly of more than 70% (percent by mass) and of less than 74% (percent by mass). In particular a glass material which is an alkali metal-alkaline earth metal silicate glass may advantageously have a silicon dioxide fraction of more than 70% (percent by mass) and of less than 74% (percent by mass).

Alternatively or additionally it may be advantageous for the glass material to have an alkali metal oxide fraction, more particularly sodium oxide fraction ($Na_2O$) and/or lithium oxide fraction ($Li_2O$), in the range from 5% (percent by mass) to 20% (percent by mass), more particularly in the range from 10% (percent by mass) to 14.5% (percent by mass) or in the range from 12% (percent by mass) to 13.5% (percent by mass).

The glass material may (alternatively or additionally) advantageously have a potassium oxide fraction ($K_2O$) of at most 7% (percent by mass), more particularly of at most 3% (percent by mass) or of at most 1% (percent by mass). In particular the glass material may have a potassium oxide fraction in the range from 0.5% (percent by mass) to 0.9% (percent by mass).

Alternatively or additionally, it may be advantageous for the glass material to have a boron trioxide fraction ($B_2O_3$) of less than 15% (percent by mass), more particularly of at most 5% (percent by mass).

There are no fundamental restrictions on the shape of the glass container. With a view in particular to the production of bottles and drinks vessels, the glass container may advantageously have at least one portion which has a tubular embodiment. More particularly at least one portion of the glass container may have a circular-cylindrical embodiment. It is also possible for the glass container of the disclosure to have a cylindrical portion whose base area deviates from the circular shape. In particular, for example, the base area may have an oval embodiment or may have the shape of a polygon.

Very generally the glass container may for example have a rotationally symmetrical embodiment. It is alternatively also possible for the glass container, in particular in a horizontal cross section, to have an angular shape, more particularly a square shape.

As already mentioned, the glass container of the disclosure may be embodied more particularly as glass packaging, more particularly as a yoghurt jar or jam jar or preserve jar, or as a drinking glass, more particularly wine glass, or stem glass or beer glass or champagne glass or cocktail glass, or as a bottle, more particularly as a drinking bottle or beverage bottle or sparkling wine bottle or beer bottle or wine bottle.

BRIEF DESCRIPTION OF THE DRAWING VIEWS

Figure 2:
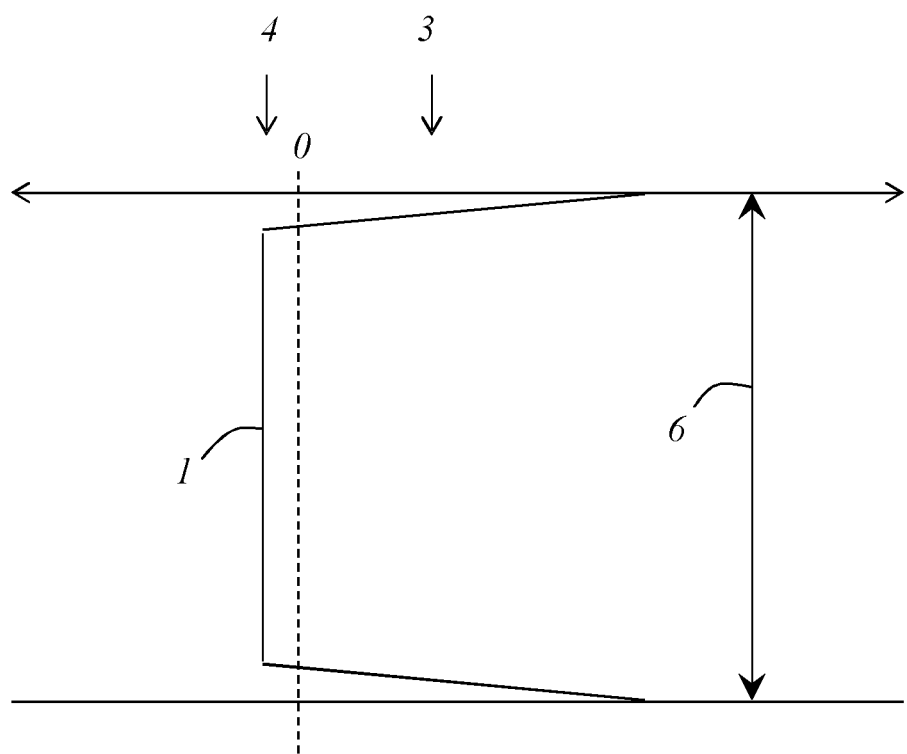
Figure 3:
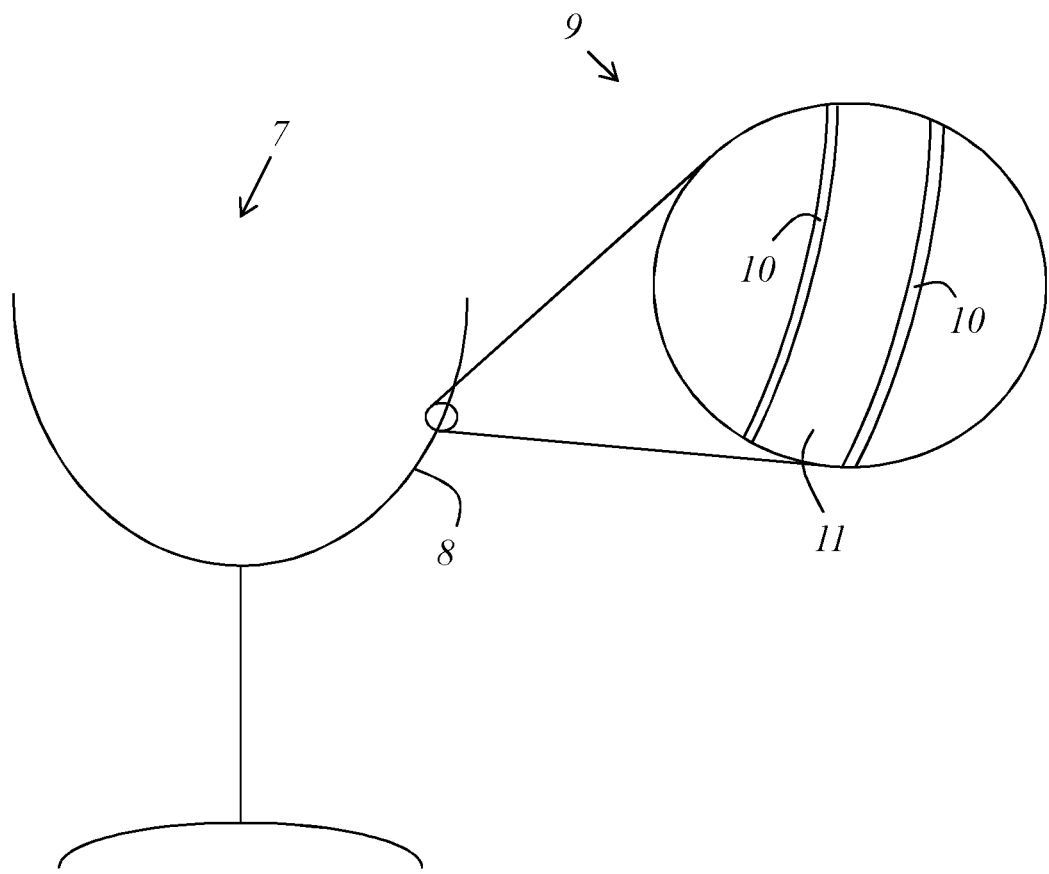
Figure 4:
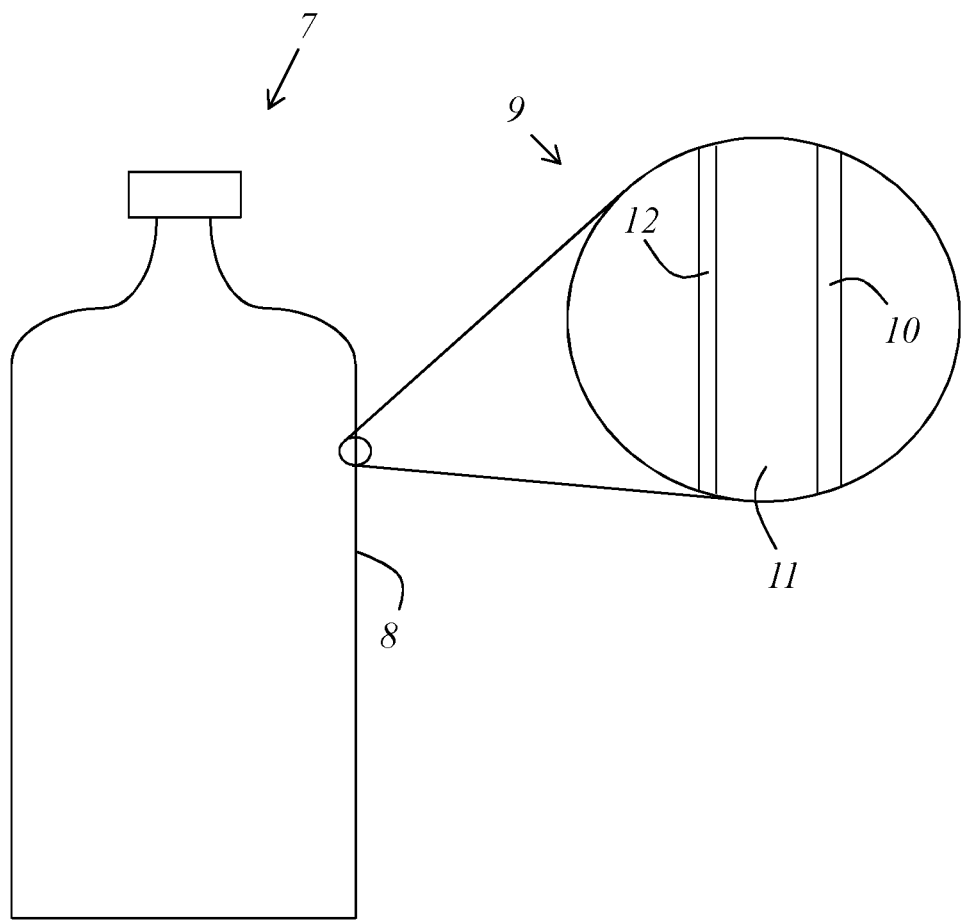

In the drawing, the subject matter of the disclosure is represented illustratively and schematically and is described below with reference to the figures, where elements that are identical or identical in effect are usually provided with the same reference signs, even in different exemplary embodiments. Here:

FIG. 1 shows a schematic representation, not true to scale, of a first component of the stress profile 1 within the wall of a glass container of the disclosure, FIG. 2 shows a schematic representation, not true to scale, of a second component of the stress profile 1 within the wall of a glass container of the disclosure, FIG. 3 shows a first exemplary embodiment of a glass container of the disclosure, and FIG. 4 shows a second exemplary embodiment of a glass container of the disclosure.

DETAILED DESCRIPTION

FIG. 1 shows a schematic representation, not true to scale, of a first component of the stress profile 1 within the wall 8 of a glass container of the disclosure, the wall having a thickness 6. The first component of the stress profile 1 derives from the fact that initially a blank is produced and is heated to a primary temperature which lies at most 50 Kelvins below and at most 30 Kelvins above the Littleton softening point of the glass material, and is subsequently quenched to a quenching temperature which lies at least 200 Kelvins and at most 550 Kelvins, more particularly at least 200 Kelvins and at most 450 Kelvins, below the primary temperature.

In the diagram the compressive stress 3 increases, starting from the dashed zero line, toward the right, while the tensile stress 4 increases, starting from the dashed zero line, toward the left.

It is apparent that the wall 8, on each of both sides, has a compressive stress 3 which decreases toward the inside and which transitions into a tensile stress 4, which increases up to the center between the outer sides of the wall; the profile of the tensile stress as a function of the depth does not have a linear portion and as a function of the depth does not have a portion in which the tensile stress 4 is constant. In the center between the outer sides of the wall, the first component has a maximum 5 of tensile stress 4.

The first component of the stress profile 1 represented in FIG. 1, within the wall of a glass container of the disclosure, is joined, reinforcing the strength of the glass container, by a second component of the stress profile 1 within the wall of a glass container of the disclosure, as is represented schematically in FIG. 2.

FIG. 2 shows a schematic representation, not true to scale, of a second component of the stress profile 1 within the wall 8 of a glass container 7 of the disclosure, this representation deriving from the fact that the two surface layers 10 are enriched in potassium and depleted in sodium and/or lithium, while the inner layer 11 directly bordering the surface layers 10 is not enriched in potassium and not depleted in sodium and/or lithium. It is apparent that the stress profile 1 of the second component in the inner layer 11 is very largely linear.

Both the first component and the second component contribute to the strength of the glass container 7. The stress profile effective overall is therefore determined jointly by the first component and the second component, and so ultimately on each of both sides, the wall 8 has a compressive stress 3 down to a compressive stress depth 2 and beyond the compressive stress depth 2 has a tensile stress 4, where the tensile stress 4 rises with increasing depth up to a tensile stress maximum 5 disposed in the inner layer 11 and/or where the profile of the tensile stress 4 as a function of the depth does not have a linear portion and/or where the profile of the tensile stress 4 as a function of the depth does not have a portion in which the tensile stress 4 is constant.

FIG. 3, in a cross-sectional representation, shows a first exemplary embodiment of a glass container 7 of the disclosure, which is embodied as a wine glass and which has a wall 8. In the enlarged representation 9 of a detail of the wall 8, the wall 8 is shown to have, on each of both sides, a surface layer 10 which is enriched in potassium and depleted in sodium and/or lithium, while an inner layer 11, more particularly an inner layer 11 directly bordering the surface layer 10, is not enriched in potassium and not depleted in sodium and/or lithium. The wall 8 has a stress profile 1 which results from the simultaneous effect of the two components represented in FIGS. 1 and 2.

FIG. 4, in a cross-sectional representation, shows a second exemplary embodiment of a glass container 7 of the disclosure, which is embodied as a bottle and which has a wall 8. In the enlarged representation 9 the wall 8 is shown to have, on one side, a surface layer 10 which is enriched in potassium and depleted in sodium and/or lithium, while an inner layer 11, more particularly an inner layer 11 directly bordering the surface layer 10, and also the other surface layer 12 are not enriched in potassium and not depleted in sodium and/or lithium. In the case of this exemplary embodiment, the wall 8 exhibits an asymmetric stress profile 1, deriving from two asymmetric components, with the tensile stress maximum being disposed eccentrically between the outer sides of the wall 8.

LIST OF REFERENCE SIGNS

1 Stress profile
2 Compressive stress depth
3 Compressive stress
4 Tensile stress
5 Tensile stress maximum
6 Thickness
7 Glass container
8 Wall
9 Enlarged representation
10 Surface layer
11 Inner layer
12 Other surface layer

What is claimed is:

1. A glass container (7) which has at least one wall (8) and which is made of a base material which is an alkali-containing silicate glass, characterized in that
   a. at least one surface layer (10) is enriched in potassium and depleted in sodium and/or lithium, while an inner layer (11) directly bordering the surface layer (10), is not enriched in potassium and not depleted in sodium and/or lithium, and in that
   b. the glass container (7), down to a compressive stress depth (2), has a compressive stress (3) and beyond the compressive stress depth (2) has a tensile stress (4), where the tensile stress (4) rises with increasing depth up to a tensile stress maximum disposed in the inner layer (11) and/or where the profile of the tensile stress (4) as a function of the depth has no linear portion and/or where the profile of the tensile stress (4) as a function of the depth has no portion in which the tensile stress (4) is constant.

2. The glass container (7) as claimed in claim 1, characterized in that the surface layer (10) has a thickness in the range from 0.5 μm to 60 μm, more particularly in the range from 0.5 μm to 30 μm, more particularly in the range from 0.5 μm to 15 μm.

3. The glass container (7) as claimed in claim 1, characterized in that the glass container (7) has at least one wall (8) having two surface layers (10) which more particularly are parallel to one another.

4. The glass container (7) as claimed in claim 1, characterized in that
   a. each of the two surface layers (10) is enriched in potassium and depleted in sodium and/or lithium, while an inner layer disposed between the surface layers (10) is not enriched in potassium and not depleted in sodium and/or lithium, and in that
   b. the wall (8) on each of both sides, down to a compressive stress depth, has a compressive stress (3) and beyond the compressive stress depth (2) has a tensile stress (4), where the tensile stress (4) rises with increasing depth up to a tensile stress maximum disposed in the inner layer (11) and/or where the profile of the tensile stress (4) as a function of the depth has no linear portion and/or where the profile of the tensile stress (4) as a function of the depth does not have a portion in which the tensile stress (4) is constant.

5. The glass container (7) as claimed in claim 1, characterized in that the tensile stress maximum is disposed centrically between the surface layers (10).

6. The glass container (7) as claimed in claim 1, characterized in that the tensile stress maximum is disposed eccentrically between the surface layers (10).

7. The glass container (7) as claimed in claim 3, characterized in that
   a. only a first of the two surface layers (10) is enriched in potassium and depleted in sodium and/or lithium, while a second of the two surface layers (10) and an inner layer (11) disposed between the two surface layers (10) are not enriched in potassium and not depleted in sodium and/or lithium, and in that
   b. the wall (8), more particularly on each of both sides, down to a compressive stress depth (2), has a compressive stress (3) and beyond the compressive stress depth (2) has a tensile stress (4), where the tensile stress (4) rises with increasing depth up to a tensile stress maximum disposed in the inner layer and/or where the profile of the tensile stress (4) as a function of the depth has no linear portion and/or where the profile of the tensile stress (4) as a function of the depth does not have a portion in which the tensile stress (4) is constant.

8. The glass container (7) as claimed in claim 7, characterized in that the tensile stress maximum is disposed eccentrically between the surface layers (10).

9. The glass container (7) as claimed in claim 3, characterized in that the wall (8) has a thickness in the range from 0.5 mm to 5 mm, or in that the wall (8) has a thickness of more than 1.5 mm.

10. The glass container (7) as claimed in claim 1, characterized in that the strength of the glass container (7) is at least 1.5 times higher than the strength of an identical glass container of identical shape and size and identical base material as the glass container (7), that does not have the features of the characterizing clause of claim 1.

11. The glass container (7) as claimed in claim 1, characterized in that the surface layer (10) has an increased hardness by comparison with the inner layer (11) and/or in that the surface layer (10) has a Martens hardness, more particularly measured in accordance with DIN EN ISO 14577-1 under a test force of 2N, in the range from 3500 N/mm$^2$ to 3900 N/mm$^2$.

12. The glass container (7) as claimed in claim 1, characterized in that in the surface layer (10) the fraction by mass of potassium down to a depth in the range from 0.5 μm to 10 μm is greater than the total fraction by mass of sodium and lithium and in that the fraction by mass of potassium beyond a depth in the range from 0.5 μm to 10 μm is less than the total fraction by mass of sodium and lithium.

13. The glass container (7) as claimed in claim 1, characterized in that the depletion of sodium and/or lithium in the potassium-enriched surface layer down to a depth of at least one quarter of the thickness of the surface layer is at least 50 percent by mass.

14. The glass container (7) as claimed in claim 1, characterized in that the glass container (7) or at least one portion of the glass container (7) has a tubular embodiment.

15. The glass container (7) as claimed in claim 1, characterized in that the glass container (7) is embodied as packaging glass, more particularly as a yoghurt jar or jam jar or preserve jar, or as a drinking glass, more particularly wine glass, or stem glass or beer glass or champagne glass or cocktail glass, or as a bottle, more particularly as a drinking bottle or beverage bottle or sparkling wine bottle or beer bottle or wine bottle.

16. The glass container (7) as claimed in claim 1, characterized in that the glass container (7) has a rotationally symmetrical embodiment.

17. The glass container (7) as claimed in claim 1, characterized in that the glass container (7), more particularly in a horizontal cross section, has an angular shape, more particularly a square shape.

18. The glass container (7) as claimed in claim 1, characterized in that the glass material is an alkali metal-alkaline earth metal silicate glass, especially a soda-lime glass or a borosilicate glass.

19. The glass container (7) as claimed in claim 9, characterized in that the wall (8) has a thickness in the range from 1 mm to 3 mm.

20. The glass container (7) as claimed in claim 19, characterized in that the wall (8) has a thickness in the range from 1.5 mm to 3 mm.

* * * * *